(12) United States Patent
Ylitalo et al.

(10) Patent No.: US 9,634,388 B2
(45) Date of Patent: Apr. 25, 2017

(54) ANTENNA BEAM

(75) Inventors: Juha Ylitalo, Oulu (FI); Taavi Hirvonen, Oulu (FI)

(73) Assignee: ELEKTROBIT WIRELESS COMMUNICATIONS OY, Oulu (FI)

( * ) Notice: Subject to any disclaimer, the term of this patent is extended or adjusted under 35 U.S.C. 154(b) by 583 days.

(21) Appl. No.: 13/122,181

(22) PCT Filed: Oct. 13, 2008

(86) PCT No.: PCT/FI2008/050569
§ 371 (c)(1),
(2), (4) Date: Apr. 20, 2011

(87) PCT Pub. No.: WO2010/043750
PCT Pub. Date: Apr. 22, 2010

(65) Prior Publication Data
US 2011/0188418 A1 Aug. 4, 2011

(51) Int. Cl.
| | | |
|---|---|---|
| *H01Q 3/30* | (2006.01) | |
| *H04B 7/0408* | (2017.01) | |
| *H01Q 21/08* | (2006.01) | |
| *H01Q 3/40* | (2006.01) | |
| *H01Q 21/29* | (2006.01) | |

(52) U.S. Cl.
CPC .............. *H01Q 3/30* (2013.01); *H01Q 3/40* (2013.01); *H01Q 21/08* (2013.01); *H01Q 21/29* (2013.01); *H04B 7/0408* (2013.01)

(58) Field of Classification Search
CPC .. H01Q 3/40; H01Q 3/30; H01Q 3/26; H01Q 11/14; H01Q 21/006; H01Q 21/06; H01Q 21/29; H01Q 21/22; H01Q 21/08; H01Q 25/00; H01Q 25/005

USPC ........................................ 342/373; 455/562.1
See application file for complete search history.

(56) References Cited

U.S. PATENT DOCUMENTS

| | | | | |
|---|---|---|---|---|
| 3,270,336 | A * | 8/1966 | Birge | 342/158 |
| 4,163,974 | A | 8/1979 | Profera | |
| 4,916,454 | A | 4/1990 | Bull et al. | |
| 5,115,248 | A * | 5/1992 | Roederer | 342/373 |
| 6,232,927 | B1 * | 5/2001 | Inoue et al. | 343/844 |
| 6,480,154 | B1 * | 11/2002 | Bella et al. | 342/372 |
| 6,870,515 | B2 * | 3/2005 | Kitchener | H04B 7/0417 342/361 |

(Continued)

FOREIGN PATENT DOCUMENTS

| | | | | |
|---|---|---|---|---|
| CA | 2136048 A1 * | 5/1995 | | H01Q 1/32 |
| EP | 0942489 A1 | 9/1999 | | |
| WO | WO 2007023371 A1 * | 3/2007 | | G01S 13/42 |

OTHER PUBLICATIONS

Cummings, W. C. "Multiple Beam Forming Networks," Massachusetts Institute of Technology Lincoln Labratory, Technical Note 1978-9, Apr. 18, 1978, pp. 1-63.*

(Continued)

*Primary Examiner* — Gregory C Issing
(74) *Attorney, Agent, or Firm* — Hoffmann & Baron, LLP

(57) ABSTRACT

A fixed phase shift for each of a plurality of radio frequency signal components directed to or received from a plurality of antenna elements is formed in a phase shifter. A desired antenna beam pattern with at least one grating lobe is formed on the basis of the phase-shifted radio frequency signal components of the antenna elements in a predefined antenna structure.

18 Claims, 5 Drawing Sheets

(56) References Cited

U.S. PATENT DOCUMENTS

| | | | |
|---|---|---|---|
| 6,992,621 B2* | 1/2006 | Casas | H01Q 1/246 342/373 |
| 7,069,053 B2* | 6/2006 | Johannisson | H01Q 1/246 342/373 |
| 2005/0101352 A1* | 5/2005 | Logothetis | H01Q 1/246 455/562.1 |
| 2006/0056335 A1 | 3/2006 | Lin et al. | |

OTHER PUBLICATIONS

Jonas Ribbe, Supplementary European Search Report for corresponding European Application No. EP08877376, p. 1-2, Mar. 5, 2012.

Mailloux, Robert J., "Phased Array Antenna Handbook", 2nd Edition, Norwood, MA: Artech House, Inc., ISBN 1-58053-689-1., pp. 12-21 and 27-30 (2005).

Timo Huttunen, International Search Report for corresponding international application, pp. 1-3 (2009).

B. Pattan, The Versatile Butler Matrix, Microwave Journal, pp. 1-5 (2004).

\* cited by examiner

ANTENNA BEAM

CROSS-REFERENCE TO RELATED APPLICATION

This application is a National Phase application of International Application No. PCT/FI2008/050569, filed Oct. 13, 2008, which is incorporated herein by reference in its entirety.

BACKGROUND

Field

The invention relates to an antenna beam of an antenna having a plurality of elements.

Description of the Related Art

A Butler matrix with an antenna array designed for the Butler matrix can be used to form a discrete set of orthogonal beams. Each beam is directed towards a predetermined direction which depends on the phase shifts generated in the Butler matrix. A typical number of beams is four to eight.

In a Butler matrix, phase shifts of different signals are typically formed in passive analog circuits, and hence the phase shifts of signals cannot be changed without changing the whole a Butler matrix. The structure of an antenna array utilizing a Butler matrix is such that the spacing between two successive elements in the antenna array is roughly half a wavelength of the radio frequency radiation in order to form desirable lobes and avoid grating lobes.

However, there are problems involved with the design. The present use of a Butler matrix and an antenna array leaves no room for changing the antenna beam pattern and the configuration cannot flexibly be applied, for example, to omni-directional sites or to a site needing certain directionality.

There have been attempts to solve the problems. Digital beam forming at base band helps with the lobes but adds drastically to the complexity of transmitters and receivers. Furthermore, digital beam forming requires accurate on-line calibration and brings along a lot of additional complexity to the base band processing such as estimation of spatial radio channel characteristics. Hence, there is a need for simpler and still flexible antenna configurations.

SUMMARY

An object of the invention is to improve beam forming. According to an aspect of the invention, there is provided a method of forming an antenna beam pattern in a radio system. The method further comprises forming a fixed phase shift for each of a plurality of radio frequency signal components directed to or received from the plurality of antenna elements; and forming a desired antenna beam pattern with at least one grating lobe on the basis of the phase-shifted radio frequency signal components of the antenna elements in a predefined antenna structure.

According to another aspect of the invention, there is provided an antenna. The antenna comprises a phase shifter; a plurality of elements; the phase shifter being configured to form a fixed phase shift for each of a plurality of radio frequency signal components directed to or received from the plurality of antenna elements; and the antenna elements having a structure configured to form a desired antenna beam pattern with at least one grating lobe using the fixed phase shifts on the basis of the phase-shifted radio frequency signal components of the antenna elements.

According to another aspect of the invention, there is provided a transmitter. The transmitter comprises an antenna which comprises a phase shifter; a plurality of elements; the phase shifter being configured to form a fixed phase shift for each of a plurality of radio frequency signal components directed to the plurality of antenna elements; and the antenna elements having an antenna structure configured to form a desired antenna beam pattern with at least one grating lobe using the fixed phase shifts on the basis of the phase-shifted radio frequency signal components of the antenna elements.

According to another aspect of the invention, there is provided a receiver. The receiver comprises an antenna which comprises a phase shifter; a plurality of elements; the phase shifter being configured to form a fixed phase shift for each of a plurality of radio frequency signal components received from the plurality of antenna elements; and the antenna elements having an antenna structure configured to form a desired antenna beam pattern with at least one grating lobe using the fixed phase shifts on the basis of the phase-shifted radio frequency signal components of different antenna elements.

The invention provides several advantages. A desired antenna pattern can be formed without calibration and complexity.

BRIEF DESCRIPTION OF THE DRAWINGS

In the following, the invention will be described in greater detail with reference to embodiments and the accompanying drawings, in which.

DETAILED DESCRIPTION

The following embodiments may be applied to radio frequency signals in various radio systems. The applications include, for example, WiMAX (Worldwide Interoperability for Microwave Access), HSPA (High-Speed Packet Access), 3GPP (Third Generation Partnership Project) LTE (Long Term Evolution). It may also be applied with different physical layer multiple access techniques such as CDMA (Code Division Multiple Access), WCDMA (Wide-band CDMA), FDMA (Frequency Division Multiple Access), TDMA (Time Division Multiple Access), OFDMA (Orthogonal Frequency Division Multiple Access). It also applies to TDD (Time Division Duplex) and FDD (Frequency Division Duplex.

Figure 1:
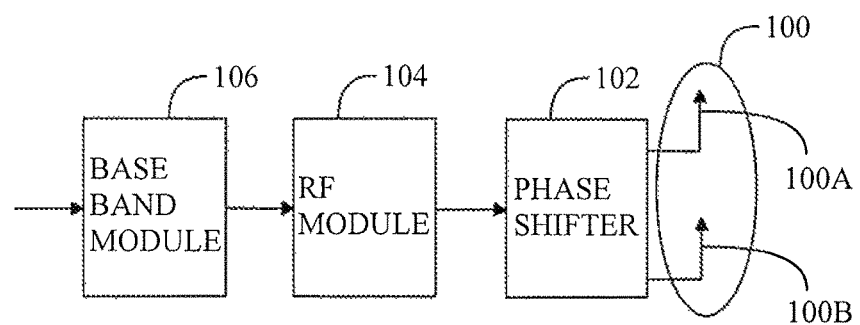
FIG. 1 shows a transmitter.

FIG. 1 presents a transmitter comprising an antenna array 100, a phase shifter 102, radio frequency module 104, and a base band module 106. The base band module 106, which may comprise a processor, memory and a suitable computer program, may perform base band signal processing and feed the signal through an optical connection to the radio frequency module 104. The base band module 106 may instead or additionally comprise programmable hardware, such as FPGA (Field Programmable Gate Array). The optical connection may be an optical fiber, for example. Instead of an optical connection, a wired electrical or a wireless connection may be used. The radio frequency module 104 may mix a base band signal to a radio frequency signal and feed the radio frequency signal to the phase shifter 102. The phase shifter 102 may be an analog phase shifting circuit which may be an analog beam forming component, such as a Butler matrix, microstrips, stripline circuit or the like. The phase shifter 102 divides the signal to be transmitted into at least two signal components and each signal component is phase-shifted by a predetermined amount. Each signal component is fed to an element of the antenna array 100. A desired transmission antenna beam pattern is formed on the basis of interference of the phase-shifted radio frequency signal components transmitted through different elements 100A, 100B of the antenna 100. Two antenna elements 100A, 100B are shown in FIG. 1 but in general there may be more than two elements. The implementation of the phase shifter may affect the required signaling throughout the system. For example, the number of signal paths from a base band module to the phase shifter may change according to the phase shifter used.

Figure 2:
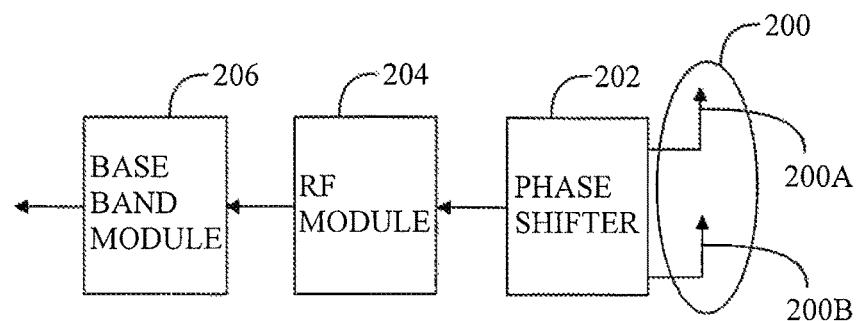
FIG. 2 illustrates a receiver.

FIG. 2 presents a receiver comprising an antenna array 200, a phase shifter 202, a radio frequency module 204 and a base band module 206 which may comprise a processor, memory and a suitable computer program. The antenna array 200 having elements 200A, 200B receives an electromagnetic signal at radio frequency and each element 200A, 200B feeds the signal components to the phase shifter 202. The phase shifter 202 phase-shifts each radio frequency signal component to a predetermined extent and combines the signal components. This leads to selective reception with respect to the direction of the signals i.e. reception beams. The combined signal is then mixed to base band in the radio frequency module 204 and the base band signal is fed to the base band module 206 for signal processing. A desired reception antenna beam pattern may be formed on the basis of interference of the phase-shifted radio frequency signal components received from the different elements 200A, 200B of the antenna 200. Two antenna elements 200A, 200B are shown in FIG. 2 but in general there may be more than two elements.

In an embodiment, the radio frequency module 104 and the phase shifter 102 may be integrated together such that they form a unified structure. Similarly, the radio frequency module 204 and the phase shifter 202 may be integrated together.

In an embodiment, the phase shifter 102 and the antenna 100 may be integrated together such that they form a unified structure. Similarly, the phase shifter 202 and the antenna 200 may be integrated together.

In an embodiment, the radio frequency module 104, the phase shifter 102, and the antenna 100 may be integrated together such that they form a unified structure. Similarly, the radio frequency module 204, the phase shifter 202, and the antenna 200 may be integrated together.

In the phase shifter 102, 202, each fixed phase shift may actually be designed for an antenna array having elements in such a predefined structure that a discrete set of orthogonal beams are formed. The predefined structure usually requires that the distance between successive antenna elements should be less than a wavelength of the radio frequency carrier.

Figure 3:
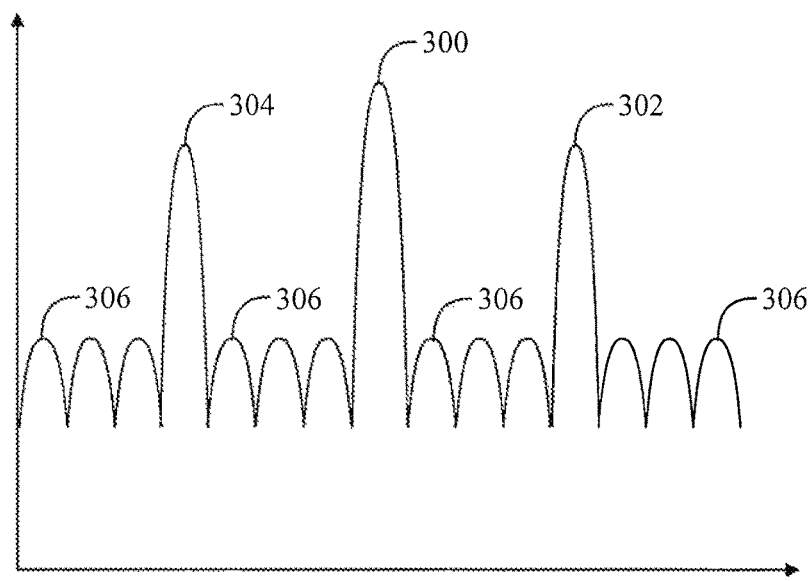
FIG. 3 illustrates different beams.

In antenna arrays having a distance between successive elements greater than one half of a wavelength of a carrier frequency special side lobes due to an aliasing effect are formed. The aliasing effect results from the fact that the Nyqvist sampling criterion in spatial domain is not fulfilled. As can be seen in FIG. 3, the special side lobes (side maximums) called grating lobes 302, 304 have a substantially larger power than the usual side lobes 306, and may have at least nearly the same power level as the main lobe 300. The horizontal axis denotes the azimuth angle in an arbitrary scale and the vertical axis is the magnitude of a beam pattern. If the Nyqvist sampling criterion is fulfilled, grating lobes can be avoided at all scan angles. However, for a limited angular aperture (scan angles) the grating lobes can be avoided even if the inter-element spacing is somewhat larger than one half of a carrier wavelength. For example, in the case of linear arrays, the limiting value (condition for grating lobes) for the element spacing may be mathematically expressed as follows:

$$d/\lambda < 1/(1+\sin|\theta_{max}|) \qquad (1)$$

where d is the distance between successive elements, $\lambda$ is the wavelength of a carrier frequency, and $\theta_{max}$ is the maximum angle between a main beam of the antenna pattern and an axis of the array (i.e. so called maximum scan angle). If the element spacing is half a wavelength or less, grating lobes are avoided at all scan angles. If the element spacing is between half a wavelength and one wavelength, maximum scan angle is limited according to equation (1). If the element spacing is larger than a wavelength, grating lobes exist at all scan angles.

However, in an embodiment the structure of the antenna elements is different from a conventional structure providing a discrete set of orthogonal beams without grating lobes. In an embodiment, the distance between the antenna elements is set larger than one half of the wavelength of the radio frequency signal in order to create at least one grating lobe in a desired direction.

In a transmitter or a receiver, a desired antenna beam pattern may be formed with an antenna 100, 200 having a larger spacing between antenna elements 100A, 100B, 200A, 200B than a limiting value given by, for example, equation (1).

In antenna arrays having a distance between successive elements greater than half a wavelength of a carrier, special side lobes due to the aliasing effect are formed. As can be seen in FIG. 3, the special side lobes called grating lobes 302, 304 have a substantially larger power than the usual side lobes 306 and may have at least nearly the same power level as the main lobe 300. The horizontal axis is the azimuth angle in an arbitrary scale and the vertical axis is the magnitude of a beam. Grating lobes are usually considered highly undesirable. However, the present solution utilizes the grating lobes.

Figure 4:
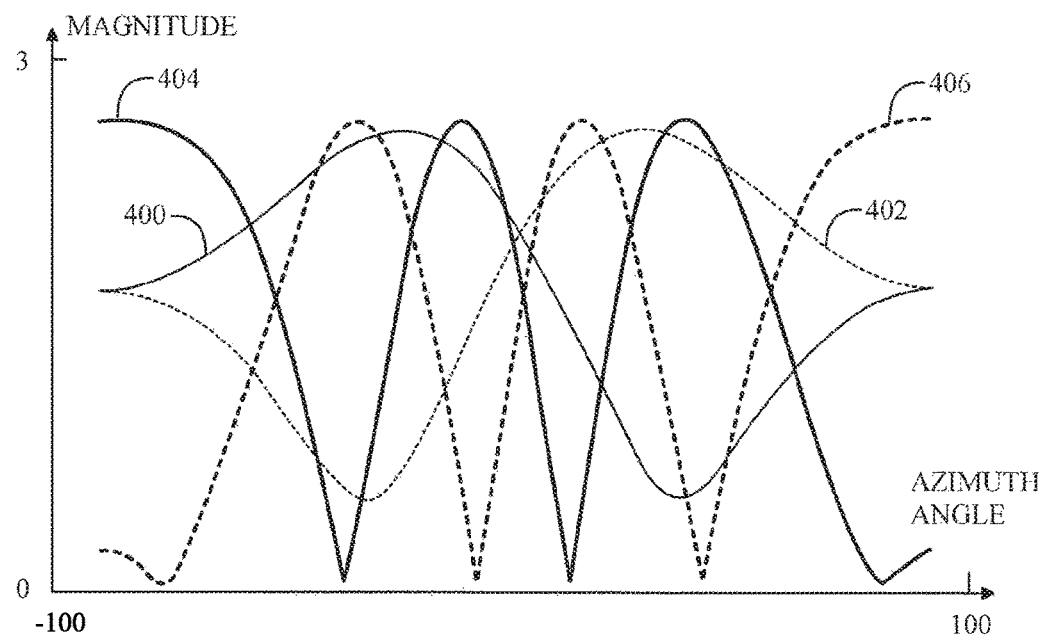
FIG. 4 illustrates an omni-directional antenna beam pattern.

In an embodiment, the spacing of the antenna elements 100A, 100B, 200A, 200B may be, for example, about 0.75, 1.25, 1.75 wavelengths of the carrier frequency of the radio frequency signal. In general, the spacing of the antenna elements may be approximately $(x+n*0.5)\lambda$, where $0<x\leq0.5$, n is a non-negative integer, and $\lambda$ is a wavelength of the radio frequency carrier. In this way, grating lobes may be formed deliberately for creating an omni-directional beam pattern. Since the grating lobes are utilized, the spacing of the antenna elements is larger than $\lambda/2$, and x and n can be defined so that the desired number and directions of grating lobes are obtained. FIG. 4 presents antenna beam patterns 400, 402 with a Butler matrix and antenna spacing of half a wavelength and antenna beam patterns 404, 406 with the same Butler matrix and antenna spacing of 1.25 wavelengths for an omni-directional purpose. The horizontal axis is the azimuth angle in degrees and the vertical axis is the magnitude of a beam pattern in an arbitrary scale. As there are only two antenna elements in this example, two orthogonal beams may be formed. It can be noticed that the antenna beam patterns 404, 406 cover the azimuth directions −90° to −60° and 60° to 90° with a higher gain than the conventional antenna beam patterns 400, 402. Moreover, the angular space can be divided into two beams, which gives a 3 dB gain in the beam forming mode.

Figure 5:
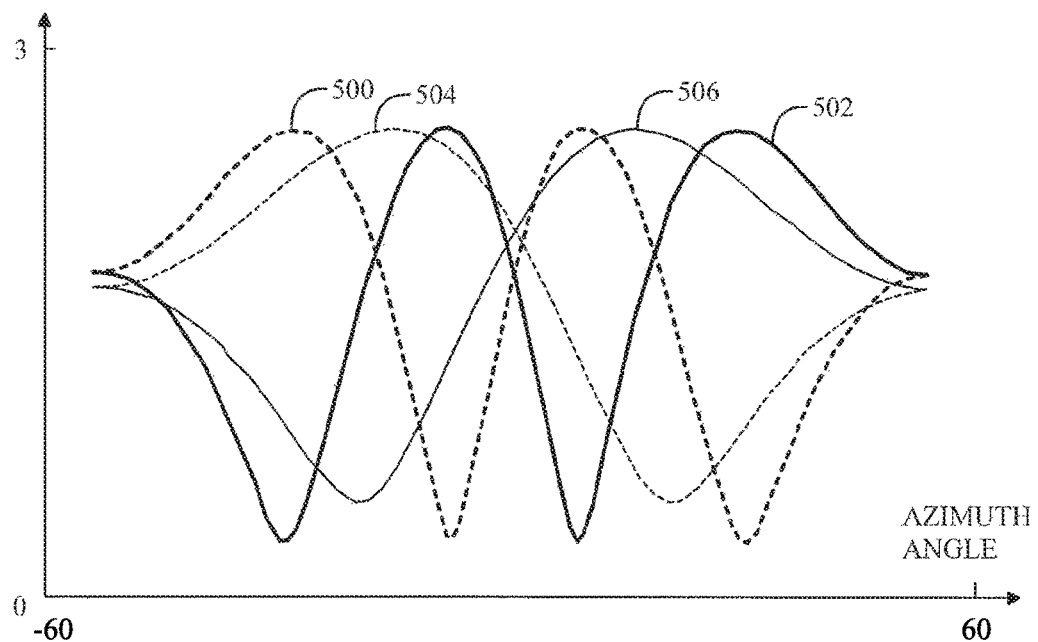
FIG. 5 illustrates an antenna pattern radiating to an angle of 120°.

In an embodiment, the spacing of the antenna elements 100A, 100B, 200A, 200B may be, for example, about 1.0, 1.5, 2.0 wavelengths of the carrier frequency of the radio frequency signal. In general, the spacing of the antenna elements may be approximately $(0.5+n*0.5)\lambda$, where n is a non-negative integer, and $\lambda$ is a wavelength of the radio frequency carrier. In this way grating lobes may be formed deliberately for having an antenna radiating to a sector covering an angle of 120°. Since the grating lobes are utilized, the spacing of the antenna elements is larger than $\lambda/2$. FIG. 5 presents antenna beam patterns 500, 502 with a Butler matrix and antenna spacing of 1.0 wavelength and antenna beam patterns 504, 506 with the same Butler matrix and antenna spacing of half a wavelength for an antenna pattern radiating to a sector covering an angle of 120°. The horizontal axis is the azimuth angle in degrees and the vertical axis is the magnitude of a beam pattern in an arbitrary scale. As there are only two antenna elements in this example, two orthogonal beams are formed (one drawn in a solid line and the other drawn in a dashed line). It can be noticed that the antenna beam patterns 500, 502 provide less correlation due to orthogonality. For example, in the directions of beam pattern maxima of one beam the other beam has nulls. Moreover, the angular space can be divided into two beams which give a 3 dB gain in the beam forming mode.

A desired beam may be formed using the following steps. A desired width of a sector for the at least one antenna beam pattern may be determined. A number of grating lobes for the sector may be determined. A spacing of the antenna elements may be determined. The determination may mean an analytical calculus, a computer simulation, a measurement of antenna patterns, or recognition of the requirements due to radio network topology and planning and the allowed antenna size. Phase shifts for different antenna elements may be set using a Butler matrix or a similar phase shift network. The phase angle shifts of the Butler matrix lead to orthogonal beams but other phase shifts result in non-orthogonal beams which can also be employed in an embodiment. All of these steps may be performed in a processor with a suitable computer program or with a suitable electronic circuit, for example in a base band module 106, 206.

Figure 6:
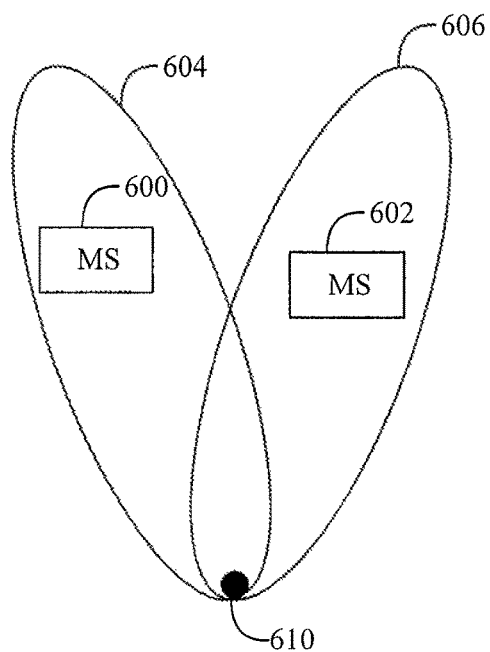
FIG. 6 illustrates different beams transmitting to different receivers.

In an embodiment of FIG. 6, different beams 604, 606 may be transmitted from a transmitter 610 to different receivers 600, 602. The processor with a suitable computer program in the base band module 106 may control that proper data is fed to each beam. Often that means that different data is fed to different beams. This embodiment can be considered as a beam forming mode. This is often considered as a MISO (Multiple Input Single Output) mode of transmission with multiple transmission antenna elements and a single reception antenna element.

Figure 7:
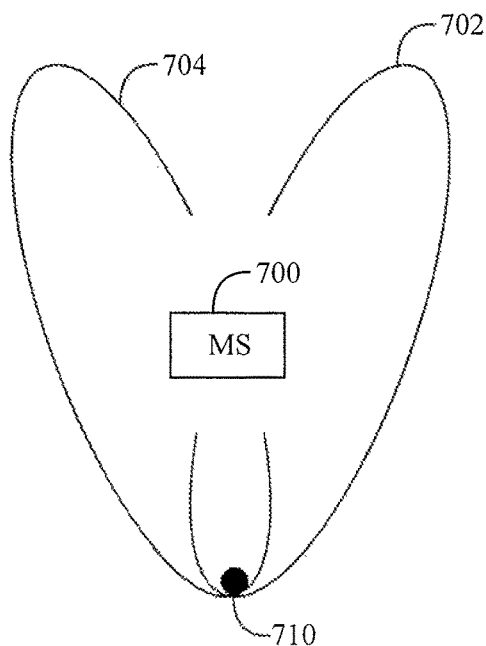
FIG. 7 illustrates beams of different data directed to a receiver.

In an embodiment of FIG. 7, different data may be transmitted from a transmitter 710 to a receiver 700 through different beams 702, 704. In this example, the receiver 700 includes at least two antenna elements. The transmitter 710 may be a base station and the receiver 700 may be a subscriber terminal. The transmission may be performed simultaneously or at different moments. The processor with a suitable computer program in the base band module 106 may control that the feeding of the data is carried out to different beams. Correspondingly, different data streams from different antennas of the transmitter 710 may be received through both different beams in a receiver 700. Then the base band module 206 of a receiver may control the reception from different beams using for example MIMO (Multiple Input Multiple Output) receiver techniques. This embodiment can be considered as a spatial multiplexing mode.

In an uplink direction, the transmission link from a subscriber terminal to a base station operates typically in a SIMO (Single Input Multiple Output) mode in which the signal is transmitted from a single terminal antenna element to a plurality of base station antennas or beams. The present solution can also be applied to the SIMO case.

Figure 8:
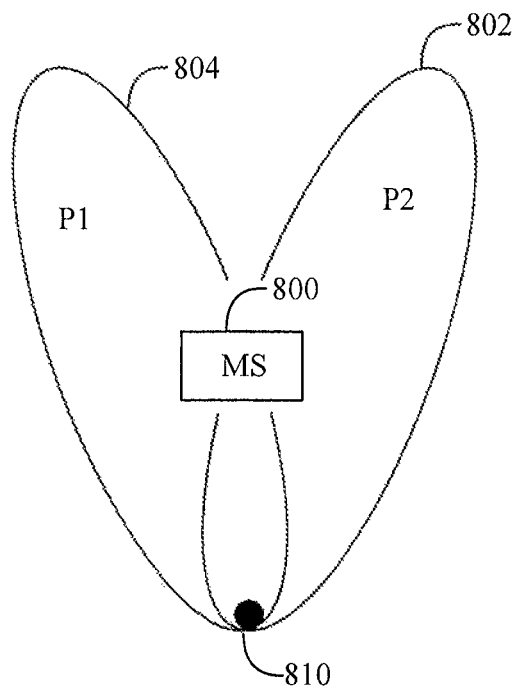
FIG. 8 illustrates beams of different data of common encoding directed to a receiver.

In an embodiment of FIG. 8, data may be coded and different parts of the coded data may be transmitted from a transmitter 810, such as a base station, through different beams 802, 804 to a receiver 800. The processor with a suitable computer program in the base band module 106 may perform encoding and control division of the encoded data and the feeding of parts P1, P2 of the data to the different beams 802, 804. Correspondingly, encoded data may be received from different beams in a receiver. When the encoded data from each beam has been received and combined the encoded data may be decoded. This embodiment can be considered as a transmit diversity technique mode on the basis of space-time coding.

Figure 9:
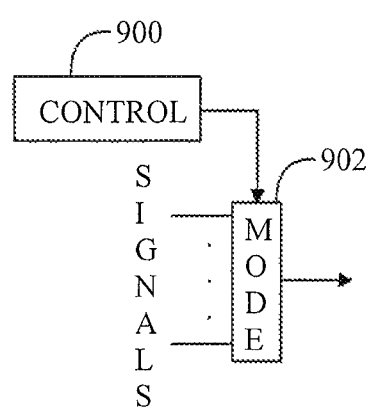
FIG. 9 illustrates switching between different modes.

In an embodiment of FIG. 9, the transmitter may switch between the beam forming mode and the spatial multiplexing mode, the beam forming mode and the diversity technique mode or the spatial multiplexing mode and the diversity technique mode. In the base band module 106, the processor 900 with a suitable computer program may control the mode switch 902 switching between different modes of transmission.

Figure 10:
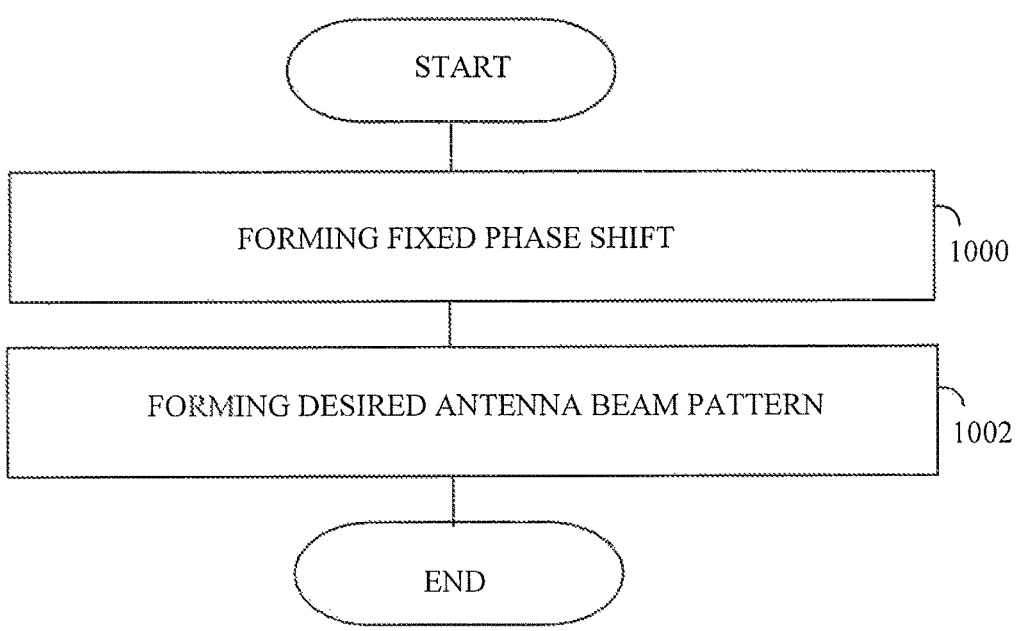
FIG. 10 presents a flow chart of the method.

FIG. 10 presents a flow chart of the method. In step 1000, a fixed phase shift is formed for each of a plurality of radio frequency signal components directed to or received from the plurality of antenna elements. In step 1002, a desired antenna beam pattern with at least one grating lobe is formed on the basis of the phase-shifted radio frequency signal components of the antenna elements in a predefined antenna structure. The antenna structure may be configured for orthogonal or non-orthogonal beams with the fixed phase shifts.

The embodiments may be implemented, for instance, with integrated circuits, phase shifters, ASIC or VLSI circuits (Application Specific Integrated Circuit, Very Large Scale Integration). Alternatively or additionally, the embodiments of the method steps may be implemented as a computer program which may be produced and distributed as a product.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but it can be modified in several ways within the scope of the appended claims.

What is claimed is:

1. A method of forming an antenna beam pattern in a radio system, the method comprising:
    processing, using a base band module, a base band signal;
    mixing, using a radio frequency module, the base band signal to generate a radio frequency signal;
    phase shifting, using a Butler matrix, the radio frequency signal to generate each of a plurality of radio frequency signal components directed to a plurality of antenna elements, the plurality of radio frequency signal components being associated with the radio frequency signal; and
    forming a desired antenna beam pattern comprising the phase shifted plurality of radio frequency signal components with a plurality of grating lobes at least nearly the same power level as a main lobe, the desired antenna beam pattern being formed in a predefined antenna structure comprising the plurality of antenna elements, the predefined antenna structure comprising a minimum spacing d between the plurality of antenna elements based on sin $|\theta_{max}|$, where $|\theta_{max}|$ is a maximum scan angle, for an aliasing effect the minimum spacing d being equal to $\lambda/(1+\sin |\theta_{max}|)$, where $\lambda$ is a wavelength of a radio frequency carrier, thereby enabling utilization of at least one of the plurality of grating lobes in a transmission of data between a transmitter and a receiver,
    wherein the desired antenna beam pattern comprises different orthogonal beams, each of the different orthogonal beams comprising different data, each of the different orthogonal beams having at least one respective grating lobe, the at least one of the plurality of grating lobes formed on the basis of the phase-shifted plurality of radio frequency signal components, the data being transmitted to the receiver.

2. The method of claim 1, further comprising forming a desired antenna beam pattern with an antenna having the spacing d between antenna elements larger than $(0.25+n\ 0.5)\lambda$, where $\lambda$ is a wavelength of a carrier and n is a non-negative integer.

3. The method of claim 1, further comprising:
    dividing, using the Butler matrix, a radio frequency signal into signal components directed to the plurality of antenna elements; and
    forming a desired transmission antenna beam pattern on the basis of the phase-shifted radio frequency signal components directed to the different antenna elements.

4. The method of claim 1, further comprising:
    receiving radio frequency signal components from a plurality of antenna elements; and
    forming a desired reception antenna beam pattern on the basis of the phase-shifted radio frequency signal components received from the plurality of antenna elements.

5. The method of claim 1, further comprising forming an antenna beam pattern with different beams for different receivers.

6. A method of forming an antenna beam pattern in a radio system, the method comprising:
    processing, using a base band module, a base band signal;
    mixing, using a radio frequency module, the base band signal to generate a radio frequency signal;
    phase shifting, using a Butler matrix, the radio frequency signal to generate each of a plurality of radio frequency signal components directed to a plurality of antenna elements, the plurality of radio frequency signal components being associated with the radio frequency signal;
    forming a desired antenna beam pattern comprising the phase shifted plurality of radio frequency signal components with a plurality of grating lobes at least nearly the same power level as a main lobe, the desired antenna beam pattern being formed in a predefined antenna structure comprising the plurality of antenna elements, the predefined antenna structure comprising a minimum spacing d between the plurality of antenna elements based on sin $|\theta_{max}|$, where $|\theta_{max}|$ is a maximum scan angle, for an aliasing effect, the minimum spacing d being equal to $(0.25+\eta\ 0.5)\lambda$, where $\eta$ is a non-negative integer, and $\lambda$ is a wavelength of a radio frequency carrier, thereby enabling utilization of at least one of the plurality of grating lobes in a transmission of data between a transmitter and a receiver,
        wherein the transmitter is configured to encode data and to divide the encoded data into at least two parts, and
        wherein the desired antenna beam pattern comprises different orthogonal beams, each of the different orthogonal beams comprising different parts of encoded data, each of the different orthogonal beams having at least one respective grating lobe, the data being for the receiver, the at least one of the plurality of grating lobes formed on the basis of the phase-shifted plurality of radio frequency signal components; and
    transmitting the parts of the encoded data in different beams to the receiver.

7. A method of forming an antenna beam pattern in a radio system, the method comprising:
    processing, using a base band module, a base band signal;
    mixing, using a radio frequency module, the base band signal to generate a radio frequency signal;
    phase shifting, using a Butler matrix, the radio frequency signal to generate each of a plurality of radio frequency signal components directed to a plurality of antenna elements, the plurality of radio frequency signal components being associated with the radio frequency signal; and
    forming a desired antenna beam pattern comprising the phase shifted plurality of radio frequency signal components with a plurality of grating lobes at least nearly the same power level as a main lobe, the desired antenna beam pattern being formed in a predefined antenna structure comprising the plurality of antenna elements, the predefined antenna structure comprising a minimum spacing d between the plurality of antenna elements based on sin $|\theta_{max}|$, where $|\theta_{max}|$ is a maximum scan angle, for an aliasing effect, the minimum spacing d being equal to $(0.25+\eta\ 0.5)\lambda$, where $\eta$ is a non-negative integer, and $\lambda$ is a wavelength of a radio frequency carrier, thereby enabling utilization of at least one of the plurality of grating lobes in a transmission of data between a transmitter and a receiver, wherein, at different moments, the desired antenna beam pattern comprises at least one of different orthogonal beams comprising different data and different orthogonal beams comprising different parts of encoded data, the at least one of the plurality of grating lobes formed on the basis of the phase-shifted plurality of radio frequency signal components, each of the different beams having at least one respective grating lobe.

8. A method of forming an antenna beam pattern in a radio system, the method comprising:

processing, using a base band module, a base band signal;

mixing, using a radio frequency module, the base band signal to generate a radio frequency signal;

phase shifting, using a Butler matrix, the radio frequency signal to generate each of a plurality of radio frequency signal components directed to a plurality of antenna elements, the plurality of radio frequency signal components being associated with the radio frequency signal;

forming a desired antenna beam pattern comprising the phase shifted plurality of radio frequency signal components with a plurality of grating lobes at least nearly the same power level as a main lobe in a predefined antenna structure comprising the plurality of antenna elements, the predefined antenna structure comprising a minimum spacing d between the plurality of antenna elements based on sin $|\theta_{max}|$, where $|\theta_{max}|$ is a maximum scan angle, for an aliasing effect, the minimum spacing d being equal to $(0.25+\eta\ 0.5)\lambda$, where $\eta$ is a non-negative integer, and $\lambda$ is a wavelength of a radio frequency carrier, thereby enabling utilization of at least one of the plurality of grating lobes in a transmission of data between a transmitter and a receiver, wherein the desired antenna beam pattern comprises different orthogonal beams, each of the different orthogonal beams comprising different data, each of the different orthogonal beams having at least one respective grating lobe, the at least one of the plurality of grating lobes formed on the basis of the phase-shifted plurality of radio frequency signal components, the data being transmitted to the receiver; and receiving encoded data from at least two beams and decoding the data.

9. An antenna comprising:

a base band module, the base band module processing a base band signal;

a radio frequency module, the radio frequency module mixing the base band signal to generate a radio frequency signal;

a phase shifter; and a plurality of antenna elements, the phase shifter phase shifting, using a Butler matrix, the radio frequency signal to generate each of a plurality of radio frequency signal components directed to the plurality of antenna elements, the plurality of radio frequency signal components being associated with a radio frequency signal, the plurality of antenna elements having a structure configured to form a desired antenna beam pattern comprising the phase shifted plurality of radio frequency signal components with a plurality of grating lobes at least nearly the same power level as a main lobe using phase shifts associated with the phase shifter, the structure comprising a minimum spacing d between the plurality of antenna elements based on sin $|\theta_{max}|$, where $|\theta_{max}|$ is a maximum scan angle, for an aliasing effect, the minimum spacing d being equal to $\lambda/(1+\sin |\theta_{max}|)$, where $\lambda$ is a wavelength of a radio frequency carrier, thereby enabling utilization of at least one of the plurality of grating lobes in a transmission of data between a transmitter and a receiver, wherein the transmitter is configured to form the desired antenna beam pattern comprising different orthogonal beams, each of the different orthogonal beams comprising different data, the at least one of the plurality of grating lobes formed on the basis of the phase-shifted plurality of radio frequency signal components, each of the different orthogonal beams having at least one respective grating lobe.

10. The antenna of claim 9, wherein the plurality of antenna elements have the minimum spacing d between each other larger than $(0.25+\eta\ 0.5)\lambda$ where $\lambda$ is a wavelength of a carrier and $\eta$ is a non-negative integer.

11. The antenna of claim 9, wherein the phase shifter is configured to divide a radio frequency signal to the plurality of antenna elements, the plurality of antenna elements having a structure configured to form a desired transmission antenna beam pattern with fixed phase shifts.

12. The antenna of claim 9, wherein the phase shifter and the plurality of antenna elements are integrated together.

13. A transmitter, the transmitter comprising an antenna which comprises:

a base band module, the base band module processing a base band signal;

a radio frequency module, the radio frequency module mixing the base band signal to generate a radio frequency signal;

a phase shifter; and a plurality of antenna elements, the phase shifter phase shifting, using a Butler matrix, the radio frequency signal to generate each of a plurality of radio frequency signal components directed to the plurality of antenna elements, the plurality of radio frequency signal components being associated with a radio frequency signal, the plurality of antenna elements having an antenna structure that forms a desired antenna beam pattern comprising the phase shifted plurality of radio frequency signal components with a plurality of grating lobes at least nearly the same power level as a main lobe using the fixed phase shifts on the basis of the phase-shifted radio frequency signal components of the plurality of antenna elements, the antenna structure comprising a minimum spacing d between the plurality of antenna elements based on sin $|\theta_{max}|$, where $|\theta_{max}|$ is a maximum scan angle, for an aliasing effect, the minimum spacing d being equal to $(0.25+\eta\ 0.5)\lambda$, where $\lambda$ is a non-negative integer, and $\lambda$, is a wavelength of a radio frequency carrier, thereby enabling utilization of at least one of the plurality of grating lobes in a transmission of data from the transmitter, wherein the transmitter is configured to form the desired antenna beam pattern comprising different orthogonal beams, each of the different orthogonal beams comprising different data, each of the different orthogonal beams having at least one respective grating lobe, the at least one of the plurality of grating lobes formed on the basis of the phase-shifted plurality of radio frequency signal components.

14. The transmitter of claim 13, wherein the transmitter is configured to form an antenna beam pattern with different beams for different receivers.

15. The transmitter of claim 13, wherein the transmitter is configured to encode data, to divide the encoded data into at least two parts, to form an antenna beam pattern with different beams, and to transmit the at least two parts of the encoded data in different beams to a receiver.

16. An antenna comprising:
a base band module, the base band module processing a base band signal;
a radio frequency module, the radio frequency module mixing the base band signal to generate a radio frequency signal;
a phase shifter; and
a plurality of antenna elements, the phase shifter phase shifting, using a Butler matrix, the radio frequency signal to generate each of a plurality of radio frequency signal components directed to the plurality of antenna elements, the plurality of radio frequency signal components being associated with the radio frequency signal, the plurality of antenna elements having a structure configured to form a desired antenna beam pattern comprising the phase shifted plurality of radio frequency signal components with a plurality of grating lobes at least nearly the same power level as a main lobe using phase shifts based on the phase-shifted radio frequency signal components of the plurality of antenna elements, the structure comprising a minimum spacing d between the plurality of antenna elements based on sin $|\theta_{max}|$, where $|\theta_{max}|$ is a maximum scan angle, for an aliasing effect, thereby enabling utilization of at least one of the plurality of grating lobes in a transmission of data between a transmitter and a receiver, wherein the transmitter is configured to form, at different moments, the desired antenna beam pattern comprising at least one of different orthogonal beams comprising different data and different orthogonal beams comprising different parts of encoded data, each of the different orthogonal beams having at least one respective grating lobe, the at least one of the plurality of grating lobes formed on the basis of the phase-shifted plurality of radio frequency signal components.

17. A transmitter, the transmitter comprising an antenna which comprises:
a base band module, the base band module processing a base band signal;
a radio frequency module, the radio frequency module mixing the base band signal to generate a radio frequency signal;
a phase shifter; and
a plurality of antenna elements, the phase shifter phase shifting, using a Butler matrix, the radio frequency signal to generate each of a plurality of radio frequency signal components directed to the plurality of antenna elements, the plurality of radio frequency signal components being associated with a radio frequency signal, the plurality of antenna elements having an antenna structure that forms a desired antenna beam pattern comprising the phase shifted plurality of radio frequency signal components with a plurality of grating lobes at least nearly the same power level as a main lobe using fixed phase shifts based on the phase-shifted radio frequency signal components of the plurality of antenna elements, the antenna structure comprising a minimum spacing d between the plurality of antenna elements based on sin $|\theta_{max}|$, where $|\theta_{max}|$ is a maximum scan angle, for an aliasing effect, thereby enabling utilization of at least one of the plurality of grating lobes in a transmission of data from the transmitter, wherein the transmitter is configured to form, at different moments, the desired antenna beam pattern comprising at least one of different orthogonal beams comprising different data and different orthogonal beams comprising different parts of encoded data, each of the different orthogonal beams having at least one respective grating lobe, the at least one of the plurality of grating lobes formed on the basis of the phase-shifted plurality of radio frequency signal components.

18. A system, the system comprising:
a base band module, the base band module processing a base band signal;
mixing, using a radio frequency module, the radio frequency module mixing the base band signal to generate a radio frequency signal;
a receiver, the receiver comprising an antenna which comprises:
a phase shifter; and
a plurality of elements, the phase shifter phase shifting, using a Butler matrix, the radio frequency signal to generate each of a plurality of radio frequency signal components a plurality of antenna elements, the plurality of radio frequency signal components being associated with the same radio frequency signal, the plurality of antenna elements having an antenna structure that receives a desired antenna beam pattern comprising the phase shifted plurality of radio frequency signal components with a plurality of grating lobes at least nearly the same power level as a main lobe using fixed phase shifts based on the phase-shifted radio frequency signal components of different antenna elements, the antenna structure comprising a minimum spacing d between antenna elements based on sin $|\theta_{max}|$, where $|\theta_{max}|$ is a maximum scan angle, for an aliasing effect, thereby enabling utilization at least one of the plurality of grating lobes by the reception of data in the receiver; and
a transmitter configured to encode data, to divide the encoded data into at least two parts, to form the desired antenna beam pattern comprising different orthogonal beams and to transmit the parts of the encoded data in the different orthogonal beams to the receiver, each of the different orthogonal beams comprising different parts of encoded data, each of the different orthogonal beams having at least one respective grating lobe, the at least one of the plurality of grating lobes formed on the basis of the phase-shifted plurality of radio frequency signal components.

* * * * *

UNITED STATES PATENT AND TRADEMARK OFFICE
CERTIFICATE OF CORRECTION

PATENT NO.         : 9,634,388 B2                                    Page 1 of 1
APPLICATION NO.    : 13/122181
DATED              : April 25, 2017
INVENTOR(S)        : Juha Ylitalo et al.

It is certified that error appears in the above-identified patent and that said Letters Patent is hereby corrected as shown below:

In the Claims

Column 10, Line 50:
Now reads:      "...where $\lambda$ is a non-negative..."
Should read:    -- ...where $\eta$ is a non-negative... --

Signed and Sealed this
Fifth Day of September, 2017

Joseph Matal
*Performing the Functions and Duties of the*
*Under Secretary of Commerce for Intellectual Property and*
*Director of the United States Patent and Trademark Office*